United States Patent [19]

Sugden

[11] Patent Number: 5,832,708
[45] Date of Patent: Nov. 10, 1998

[54] LAWN MOWER

[75] Inventor: David J. Sugden, Horicon, Wis.

[73] Assignee: Scag Power Equipment, Inc., Mayville, Wis.

[21] Appl. No.: 879,438

[22] Filed: Jun. 20, 1997

Related U.S. Application Data

[60] Provisional application No. 60/024,681, Sep., 4, 1996.

[51] Int. Cl.$^6$ .................................................. A01B 34/48
[52] U.S. Cl. ......................... 56/202; 56/10.2 R; 56/16.6
[58] Field of Search ........................... 56/10.2 A, 10.2 R, 56/10.2 E, 202, 341, DIG. 15, 16.6, 208; 100/5, 4, 88; 460/5; 364/146, 400

[56] References Cited

U.S. PATENT DOCUMENTS

| | | | |
|---|---|---|---|
| 3,606,747 | 9/1971 | Bauman | 56/202 |
| 3,863,428 | 2/1975 | Baxter | 56/10.2 |
| 3,969,875 | 7/1976 | Nofel | 56/10.2 |
| 3,971,198 | 7/1976 | Lane | 56/202 |
| 4,068,223 | 1/1978 | Steffen | 340/267 R |
| 4,782,650 | 11/1988 | Walker | 56/16.6 |
| 4,835,951 | 6/1989 | Walker | 56/16.6 |
| 4,924,664 | 5/1990 | Hicks et al. | 56/202 |
| 4,961,304 | 10/1990 | Osborn | 56/10.2 |
| 4,969,320 | 11/1990 | Langford | 56/16.6 |
| 4,981,011 | 1/1991 | Olejak | 56/10.2 |
| 5,063,729 | 11/1991 | Fox et al. | 56/30 |
| 5,321,939 | 6/1994 | Fuse et al. | 56/10.2 |
| 5,361,568 | 11/1994 | Lin et al. | 56/194 |
| 5,425,223 | 6/1995 | DeLaRonde | 56/10.2 R |
| 5,605,033 | 2/1997 | Olmr | 56/10.2 R |

FOREIGN PATENT DOCUMENTS 1242515   8/1971   United Kingdom ........... A01D 35/26

*Primary Examiner*—Michael J. Carone
*Assistant Examiner*—Robert Pezzuto
*Attorney, Agent, or Firm*—Michael Best & Friedrich LLP

[57] ABSTRACT

A lawn mower having a chute disposed within a hopper for receiving clippings from a cutter assembly and a motor for oscillating the chute to distribute the clippings. A sensor is connected to the motor energizing circuit for measuring the current flowing to the motor as a measurement of the resistance to chute oscillation resulting from the accumulation of clippings. The sensor is operative to actuate an alarm and disable a clutch which couples the mower's engine to its cutter assembly when the motor energizing current reaches a predetermined level.

18 Claims, 3 Drawing Sheets

LAWN MOWER

CROSS REFERENCE TO RELATED APPLICATION

This application relates to Provisional Application, Ser. No. 60/024,681, filed Sep. 4, 1996.

BACKGROUND OF THE INVENTION

This invention relates to lawn mowers and more particularly to a lawn mower hopper fill indicator system.

One type of commercial lawn mower includes a hopper for collecting grass clippings. The hopper is connected to the mower's cutter assembly by a conduit and blower which transport the clippings to the hopper. A pivoting chute disposed within the hopper acts to distribute the clippings throughout the interior space of the hopper. Should the cutter and blower continue to operate after the hopper has been filled to the point where it can no longer accommodate additional clippings, the clippings will accumulate in the delivery conduit and eventually overload the cutter and blower. This requires that the mower be stopped and the conduit be cleaned by hand.

SUMMARY OF THE INVENTION

It is an object of the invention to provide a new and improved hopper fill indicator system for lawn mowers.

A further object of the invention is to provide an alarm system which indicates when a lawn mower hopper is filled.

Another object of the invention is to provide a fill indicator system for lawn mower hoppers which prevents the accumulation of clippings in the grass clippings delivery system when the hopper is full.

These and other objects and advantages of the present invention will become more apparent from the detailed description thereof taken with the accompanying drawings.

In general terms, the invention comprises a lawn mover having means for distributing grass clippings within a hopper and including an inlet coupled to a cutter assembly for receiving clippings therefrom and an outlet mounted in the hopper for oscillating movement within the hopper for distributing clippings therein, means for oscillating the clippings distributing means, and means coupled to the means for oscillating for sensing the level of resistance to oscillation of the clippings distributing means resulting from the buildup of grass clippings within the hopper, said means for sensing being operable to actuate an alarm when the resistance to the oscillation of the clippings distribution means reaches a predetermined level.

According to a more specific aspect, the means for oscillating the clippings distributing means comprises an electric motor and the means for sensing comprises means for sensing the current drawn by the motor for actuating the alarm when the current exceeds a predetermined level.

According to a further aspect of the invention, means are provided for disconnecting the mower's cutter assembly from the power source when the current drawn by the motor exceeds a predetermined level.

DETAILED DESCRIPTION OF THE PREFERRED EMBODIMENTS

Figure 1:
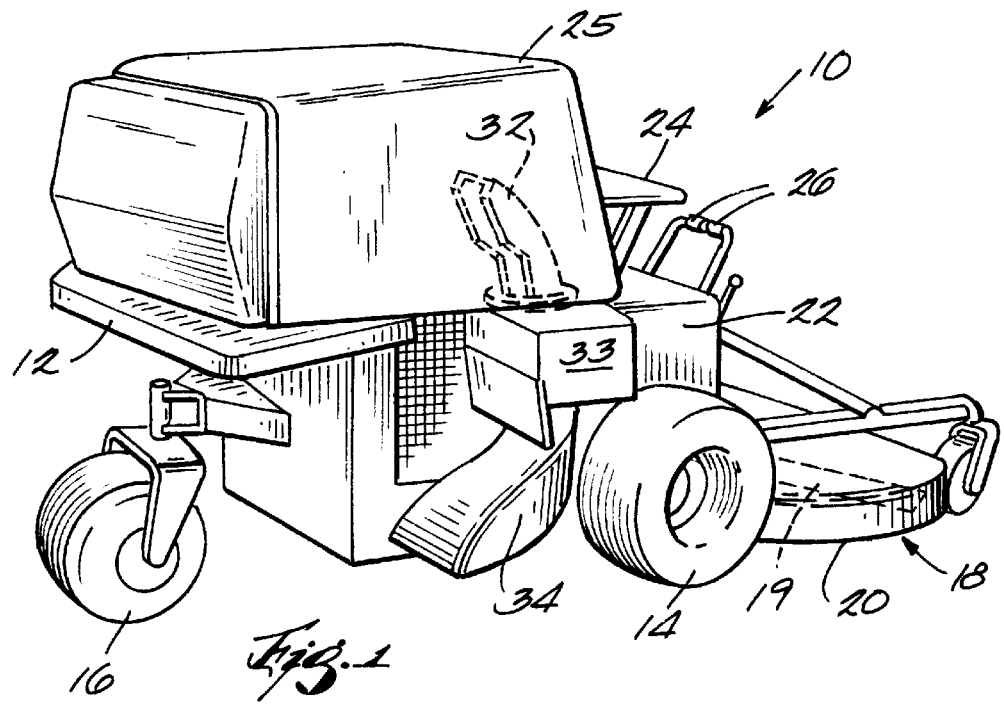
FIG. 1 is a perspective view of a lawn mower incorporating the present invention.

FIG. 1 shows a mower 10 which incorporates a clipping hopper fill indicator and alarm system according to the invention. The mower 10 is otherwise conventional and accordingly, will be described only in general terms. In particular, the mower 10 includes a frame 12 which is supported at its front by a pair of drive wheels 14 and at its rear by a caster wheel 16. A cutter assembly 18 is mounted on the frame forwardly of the drive wheels 14 and includes at least one cutter blade 19 and a housing 20 supported at its front end by casters 21. A deck or hood 22 is mounted on the frame 12 and encloses an internal combustion engine and transmission 23 (FIG. 3) which power the drive wheels 14 and the cutter blade 19 is a conventional manner. An operator seat 24 is mounted on the deck 22 and behind the operator seat there is a hopper 25 for collecting clippings from the cutter assembly 18. The drive wheels 14 may be driven from the engine and transmission 23 in any conventional manner, such as by a hydraulic system which independently drives each wheel 14. Steering may be accomplished by varying the rotational speed of each drive wheel 14 through the operation of levers 26 in a manner well known in the art.

A conduit 30 connects the cutter assembly 18 to an outlet chute 32 which is pivotally mounted in the hopper 25 for oscillating movement about a generally vertical axis. A blower assembly 33 is disposed between the cutter assembly 18 and the conduit 30 for creating an air flow which draws clippings from the cutter assembly 18 and delivers the clippings to the chute 32. Also connected to the blower assembly 33 is a side discharge chute 34. A gate (not shown) is selectively operable to couple the blower assembly 33 for the delivery of clippings either to the chute 32 or to the side discharge chute 34. An electrically operated clutch 35 (FIG. 3) is provided for coupling the cutter assembly 18 and the blower assembly 33 to the engine and transmission 23. For a more complete description of the mower 10, reference is made to U.S. patent application Ser. No. 08/610,585, filed Mar. 7, 1996, which is incorporated by reference herein.

Figure 2:
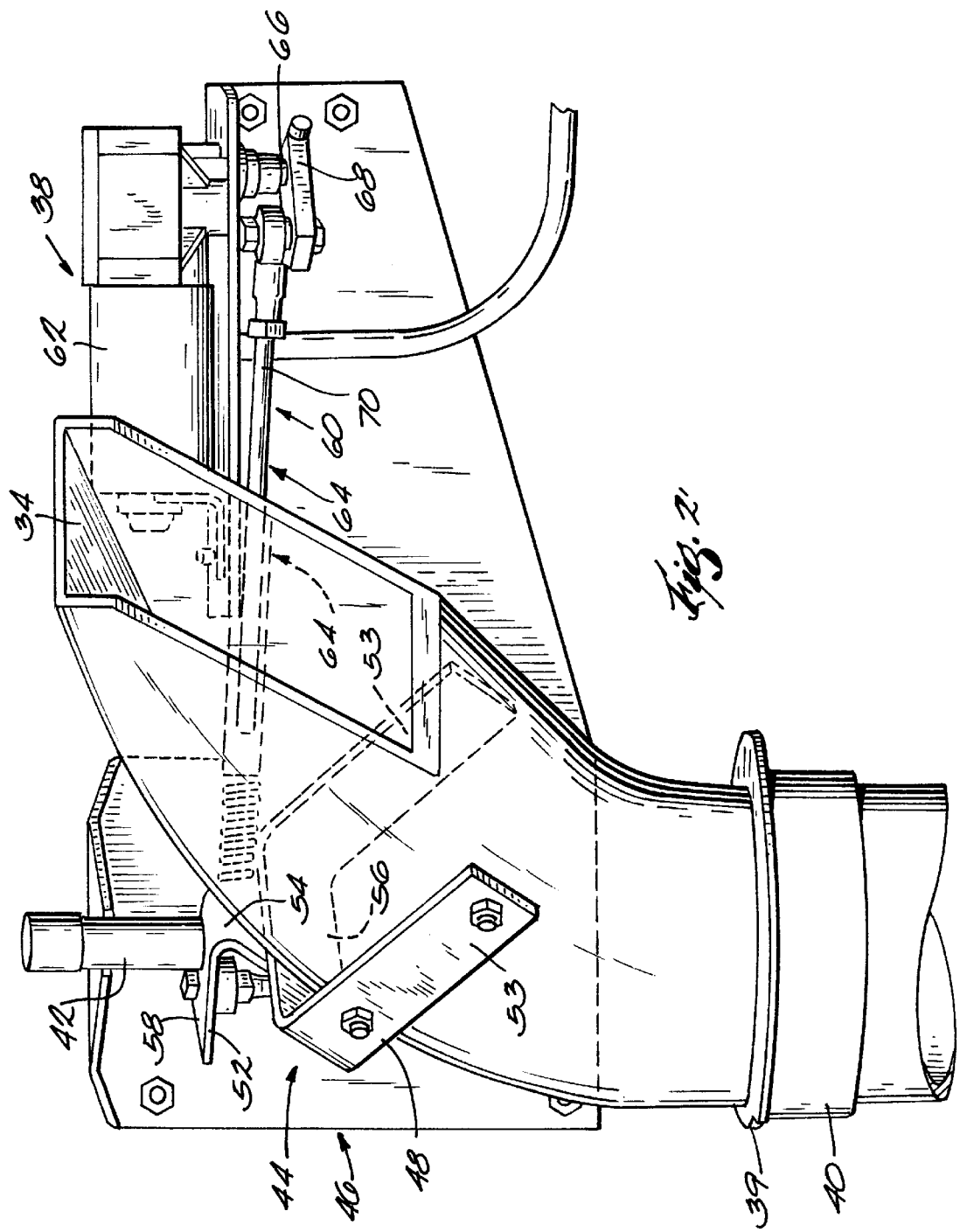
FIG. 2 is a perspective view showing the discharge chute oscillating system of the lawn mower illustrated in FIG. 1.

The outlet chute 32, shown by broken lines in FIG. 2, comprises means for distributing clippings around the hopper 25. In the preferred embodiment of the invention, the lower end of the chute 32 has an opening 36 which comprises and inlet coupled to the cutter assembly for receiving clippings therefrom. The chute 32 is generally arcuate and has a generally rectangular opening 37 at its opposite end which defines an outlet. In this manner, grass clippings traveling vertically through the upper end of conduit 30 are redirected horizontally by the chute 32 for distribution in the hopper 25. In order to more evenly distribute the clippings within the hopper 25, an oscillating assembly 38 is provided in the hopper 25 for oscillating the chute 32 about the axis of its lower opening 33. Toward this end, the chute 32 has means at its lower end to facilitate oscillatory movement. In the preferred embodiment, this includes an outwardly extending flange 39 which engages the upper edge of conduit 30. In addition, a skirt 40 extends from the outer edge of the flange 36 and surrounds the upper end of conduit 30.

The chute 32 is also mounted for oscillatory movement intermediate its ends by a pivot pin 42 extending vertically upwardly along the axis of opening 36 from a bracket assembly 44 secured to the chute 32. The upper end of pivot pin 42 pivotally engages a support 46 fixed to the wall of hopper 25.

The bracket assembly 44 includes a U-shaped bracket member 48 and a V-shaped bracket member 52. The side legs 53 of bracket member 48 are suitably secured to the sides of the chute 32 and the bracket member 52 has a first leg 54 fixed to the center section 56 of bracket 48 and its other leg 58 extends generally horizontally. The pivot pin 42 extends vertically upward from leg 58 adjacent its junction with leg 54.

The oscillating assembly 38 is mounted on the support 46 and includes a motor 62 and a linkage 64 for coupling the motor 62 to the bracket assembly 44. The motor 62 includes an output shaft 66 coupled to the linkage 64 and may be of any suitable, reversible type, such as that employed for operating automobile windshield wipers.

The linkage 64 includes a lever 68 pivotally connected at one end to the motor shaft 66 and its other end is pivotally connected to a connecting rod 70. The other end of rod 70 is pivotally connected to the leg 58 of bracket 48. It will be appreciated that as the motor shaft 66 is rotated through a predetermined angle in a first and then an opposite direction, the lever 68 similarly pivots thereby imparting alternate push and pull effects on the connecting rod 70, thereby oscillating the chute 32. Grass clippings moving upwardly through the conduit 30 and into the lower end of the chute 32 are distributed within the hopper 25.

Figure 3:
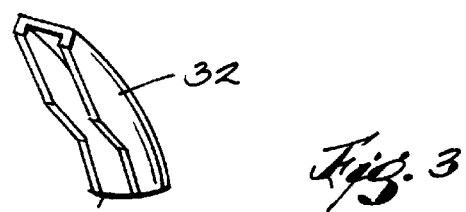
FIG. 3 is a schematic drawing illustrating one embodiment of the invention.

FIG. 3 shows a hopper fill indicator and alarm system according to a first embodiment of the invention. Here the motor 62 is connected by a conductor 72 to a battery 73 which provides electrical energy to the mower 10. A first switch SW1 in conductor 72 is connected between the motor 62 and the battery 73. Also connected to the battery 73 by a second conductor 74 and a second switch SW2 is an electrically responsive clutch 35 which is operative to couple the cutter assembly 18 and the blower assembly 33 to the engine 23. A clutch on/off switch SW3 is connected in the clutch energizing circuit and is mechanically connected to a switch SW4 between motor 62 and sensor 76. A current level sensor 76 is also connected to the motor energizing conductor 72. The sensor 76 is also connected to an actuator 79. The operator 82 is, in turn, mechanically connected for operating the switches SW1 and SW2 and for actuating the alarm 80.

Switches SW1 and SW2 are manually closed. When switches SW3 and SW4 are closed, the clutch 35 is actuated so that the cutter assembly 18 and the blower assembly 33 are driven. In addition, motor 62 is energized to oscillate the outlet chute 32 and sensor 76 is reset. As clippings collect within the hopper 25, the chute 32 encounters some resistance to its oscillatory movement. This added load increases the amount of current drawn by the motor 62 and flowing through the conductor 72 by an amount representative of the increase in the level of the clippings. The sensor 76 includes a comparitor for comparing the energizing current flowing to the motor 62 to some reference value and is set to activate the alarm 42 when the level of current reaches a threshold level representing the maximum desired height of clippings in hopper 25. In addition, the sensor may also be operative to actuate the operator 82 which opens switches SW1 and SW2 to disconnect the motor 62 and the clutch 35 from the battery 73. Deactivation of the clutch 35 disconnects the cutter assembly 18 and the blower assembly 33 from the engine and transmission 23. In order to deactivate the alarm 80, switch SW3 in the clutch circuit must be moved to an open position which also opens switch SW4 to reset the sensor 76. If the mower clipping discharge gate is in a position to discharge clippings through the side discharge chute 42, the control system may be deactivated by opening switch SW1. This turns off the motor 62 and deactivates the alarm 80.

Figure 4:
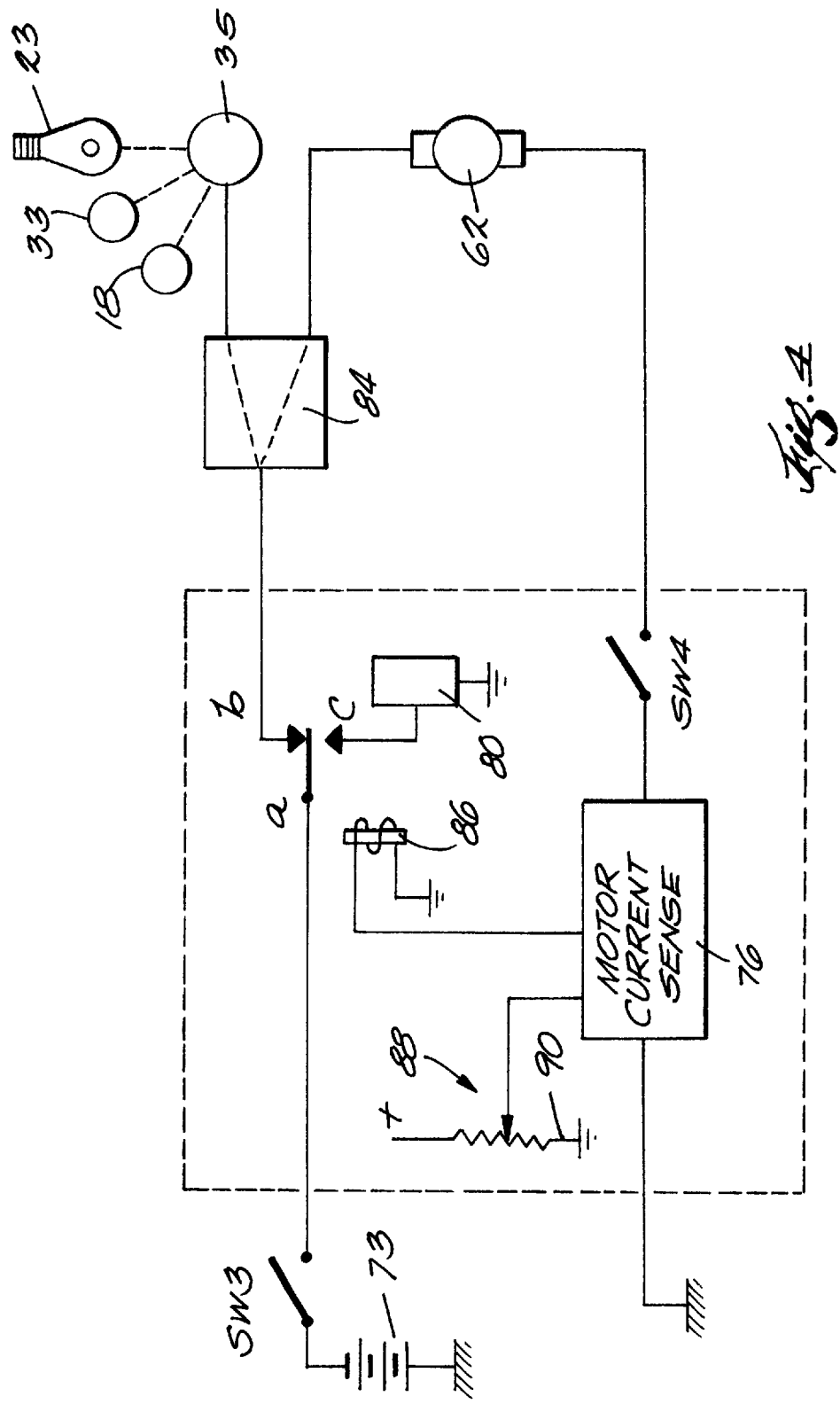
FIG. 4 is a schematic drawing illustrating an alternate embodiment of the invention.

FIG. 4 shows an alternate embodiment of the invention wherein one terminal of motor 62 is connected to the battery 73 through the clutch power distributor 84, movable contact a and fixed contact b of a relay 86, and the clutch on/off switch SW3. The other terminal of motor 62 is connected to ground through the sensor 76, on/off switch SW4 and the sensor 76. The operator comprises the coil of a relay 86 which is responsive to a signal from the sensor 76.

Sensor 76 includes a sensitivity adjustment means 88 which, in the preferred embodiment, comprises a potentiometer 90 having a wiper 92 connected to sensor 76. The current flowing through motor 62 is sensed by sensor 76 and compared to the signal from the sensitivity adjustment means 88. The coil of relay 86 is connected to sensor 76 and fixed contact c of relay 86 is connected to the alarm 80. Sensor 76 is operative to provide an energizing signal to relay 86 when the current flowing in motor 62 bears a predetermined relation to the signal from the sensitivity adjustment means 88. When relay 86 is de-energized, the movable contact a is on fixed contact b. An energizing signal from sensor 76 is operable to move contact a to fixed contact c.

Switch SW3 is normally in an open position so that with the engine 23 running, the clutch 77 is de-energized and the cutter assembly 18 and the blower assembly 33 are deactivated. In addition, switch SW4 is also open so that the energizing circuit to the wiper motor 62 is also open so that the motor 62 is de-energized.

Operation is initiated by closing switch SW3 to energize the clutch 35 which couples the cutter assembly 18 and blower assembly 33 to the engine and transmission 23. In addition, the sensor on/off switch SW4 is also closed to energize the wiper motor 62 so that the chute 32 is oscillated. The current flowing through the chute motor 62 is monitored by the sensor 76. When the motor current equals the predetermined magnitude as determined by the setting of the potentiometer 88, sensor 76 energizes the coil of relay 86 thereby moving contact a from contact b to contact c. This de-energizes the clutch 75 to disconnect the cutter assembly 18 and the blower assembly 33 from the engine 23 and also open circuits motor 62. In addition, the movement of contact a to contact c energizes the alarm 80, which may be audible, visible or both. The alarm continues to operate until the switches SW3 and SW4 are opened. This also releases relay 86 so that movable contact a engages contact b. The system is now reset.

It will be appreciated that wet grass or leaves pack more densely in the hopper 25 and thereby provide a greater resistance to oscillation of the chute 32 than relatively dry grass. To insure that the alarm 80 is not operated when the hopper 25 is merely half full of relatively denser materials, the sensitivity adjustment means 88 permits the operator to set a higher level of motor current necessary to actuate the alarm.

While only a few embodiments of the invention have been illustrated and described, it is not intended to be limited thereby, but only by the scope of the appended claims.

I claim:

1. A lawn mower including:
   a cutter assembly, drive means coupled to said cutter assembly for driving the same, a hopper for collecting grass clippings, means for distributing grass clippings within the hopper and including an inlet coupled to the cutter assembly for receiving clippings therefrom and an outlet mounted in the hopper, said distributing means being in the hopper for oscillating movement for distributing clippings in the hopper, means for oscillating said clippings distributing means, means coupled to the oscillating means for sensing the level of resistance to oscillation of said clippings distributing means resulting from the buildup of clippings within the hopper, responsive means for performing an output function, said sensing means being coupled to said responsive means and to the oscillating means and being operable to actuate said responsive means when the resistance to oscillation of the clippings distributing means reaches a predetermined level.

2. The lawn mower set forth in claim 1 and including an alarm coupled to said responsive means and operable to produce an alarm signal when actuated by the sensing means.

3. The lawn mower set forth in claim 1 wherein the oscillating means comprises electroresponsive means coupled to an energy source, said sensing means being coupled to said electroresponsive means for sensing the energy demand of the electroresponsive means and being operative to actuate said alarm when the energy demand exceeds a predetermined level.

4. The lawn mower set forth in claim 3 wherein said electroresponsive means comprises an electric motor, said sensing means being coupled to said motor for sensing the electric current drawn by said motor and being operative to actuate said responsive means and deactivate said motor when the current exceeds a predetermined level.

5. The lawn mower set forth in claim 4 and including means for adjusting the current level at which said sensing is operative to actuate said alarm and to deactivate said motor.

6. The lawn mower set forth in claim 1 wherein said responsive means is operative for uncoupling the cutter assembly from the drive means.

7. The lawn mower set forth in claim 6 wherein said electroresponsive means comprises an electric motor, said sensing means being coupled to said motor for sensing the current drawn by said motor and being operative to actuate said responsive means when the current exceeds a predetermined level.

8. The lawn mower set forth in claim 6 and including a clutch for coupling and said cutter assembly from said drive means said responsive means being operable to deactivate said clutch when the current exceeds the predetermined level.

9. The lawn mower set forth in claim 8 and including means for adjusting the current level at which said sensing means is operative to actuate said alarm and to deactivate said motor.

10. A lawn mower including a cutter assembly, an engine, an electroresponsive clutch for coupling the cutter assembly to the engine, a hopper for collecting grass clippings, a chute disposed within the hopper for distributing grass clippings and including an inlet coupled to the cutter assembly for receiving clippings therefrom and an outlet mounted in the hopper, said chute being mounted in the hopper for oscillating movement, a motor for oscillating said chute, an energy source, said motor being coupled to said energy source for drawing energizing current therefrom, sensing means coupled to the motor for sensing the level of energizing current drawn by said motor resulting from the buildup of clippings within the hopper, responsive means for performing an output function, said sensing means being coupled to said responsive means and being operative to actuate said responsive means when the level of energizing current drawn by said motor reaches a predetermined level, said responsive means being operative to deactivate said clutch upon the receipt of a signal from the sensing means so that said cutter assembly is disconnected from said engine when the level of clippings in the hopper reach a predetermined level.

11. The lawn mower set forth in claim 10 and including an alarm, said responsive means being operative to actuate said alarm when actuated by said sensing means.

12. The lawn mower set forth in claim 11 wherein said responsive means is operative to deactivate said motor when actuated by said sensing means.

13. The lawn mower set forth in claim 12 and including means for adjusting the predetermined level of energizing current required to operate said sensing means for actuating said responsive means.

14. The lawn mower set forth in claim 13 wherein said responsive means comprises switching means operative upon the receipt of a signal from the sensing means for disconnecting said clutch and motor from said energy source and connecting the alarm to said energy source.

15. A method of controlling the level of grass clippings in a hopper of a lawn mower, comprising the steps of:

delivering grass clippings to a lawn mower hopper through a chute disposed within the hopper;

oscillating the chute for distributing clippings within the hopper;

sensing a level of resistance to oscillation of the chute resulting from the buildup of clippings within the hopper; and actuating an alarm when the resistance to oscillation of the chute reaches a predetermined level.

16. The method set forth in claim 15 wherein the chute is oscillated by a motor, and disconnecting the motor from an energy source to terminate chute oscillations when the resistance to oscillation of the chute reaches said predetermined level.

17. The method set forth in claim 16 and including the step of measuring the energizing current drawn by the motor, and actuating the alarm when the energizing current reaches a predetermined level.

18. The method set forth in claim 15 wherein the cutter of the lawn mower is connected to an engine through an electroresponsive clutch, and deactivating said clutch when the resistance to oscillation of the chute reaches a predetermined level.

* * * * *